United States Patent [19]

Carrieri

[11] Patent Number: 5,708,503

[45] Date of Patent: Jan. 13, 1998

[54] PANORAMIC INFRARED-IMAGING SPECTRORADIOMETER WITH REVERSE PHASE MODULATION BEAM BROADCASTING

[75] Inventor: Arthur H. Carrieri, Abingdon, Md.

[73] Assignee: The United States of America as represented by the Secretary of the Army, Washington, D.C.

[21] Appl. No.: 734,614

[22] Filed: Oct. 18, 1996

[51] Int. Cl.⁶ ............................................. G01B 9/02
[52] U.S. Cl. ............................................. 356/346; 356/244
[58] Field of Search ............................................. 356/346, 244

Primary Examiner—Frank G. Font
Assistant Examiner—Jason D. Vierra-Eisenberg

Attorney, Agent, or Firm—Ulysses John Biffoni

[57] ABSTRACT

A spectroradiometer for analyzing chemicals located within a panorama comprised of hyperboloid mirrors for directing light received from the panorama through a collimator and via an interferometer to an array of detectors, the signals from which are subjected to parallel discrete Fourier transform and parallel spectra pattern recognition systems. Transmissions of data is achieved by using an interferometer having modulated photoelastic modulators positioned between linear polarizers, directing laser light through the interferometer to the hyperboloid mirrors and providing a receiver comprised of a linear polarizer, a detector, a plurality of band pass amplifiers, and a processor for recognizing the different patterns in the output of the amplifier that result from rotating at least one of the photoelastic modulators and polarizers to a different position.

13 Claims, 3 Drawing Sheets

PANORAMIC INFRARED-IMAGING SPECTRORADIOMETER WITH REVERSE PHASE MODULATION BEAM BROADCASTING

GOVERNMENTAL INTEREST

The invention described herein may be manufactured, used and licensed by or for the United States Government.

FIELD OF THE INVENTION

The invention is in the field of spectroradiometry.

BACKGROUND OF THE INVENTION

The present invention monitors the surrounding infrared environment for chemical clouds, detecting a presence once absorption or emission spectra characteristic of the chemical species is resolved. It broadcasts chemical presence and cloud heading when equipped with a laser transmitter that projects a polarized laser beam source with phase-encryption back through the optical system into object space. Infrared radiance received from the field of view is operated on by an interferometer and converted to an electrical signal by a photoconductor detector element. A fast Fourier transform is performed in the electrical signal to derive the amplitudes of frequency components thereof, and they are compared in a neural network to find a match with the spectra of a known chemical contaminant.

Because the apparatus may be at a great distance from the contaminants, such as, for example, when it is mounted on a unmanned aerial vehicle (UAV) and the contaminants are near the earth, the contaminants may be anywhere within a large area. In order to locate them more precisely, a collimator is positioned ahead of the interferometer, and an array of detectors is used so that the signal from each detector of the array is derived from the spectra received from a given sub-portion of the field of view. The electrical signals from each detector are then subjected to a fast Fourier transform and matched by a neural network trained with spectra of known chemicals. Thus, if a cloud of contaminants passes through the field of view, only the neural network outputs for detectors corresponding to the sub-area where a contaminant is located will indicate its presence.

Whereas such apparatus could be scanned in azimuth and elevation to identify contaminants in a 360° panorama, the required equipment would be cumbersome and costly, e.g., it might be too large and heavy for installation in a satellite or an airplane. Furthermore, there is no way of transmitting information as to the particular contaminant identified or as to its location in the panorama.

SUMMARY OF THE INVENTION

In accordance with one aspect of this invention, chemical contaminants at any point in a given panorama are simultaneously identified. This is accomplished by using hyperbolic mirrors to direct light from any point in the surrounding panorama along a common axis to a collimator. Light from a collimator is passed through an interferometer including a plurality of photoelastic modulators, PEM's, mounted between two linear polarizers to an array of photo detectors. The PEM's are modulated at different frequencies. Each detector receives spectra from a given sub-area of the panorama, and the electrical signals from each detector are subjected to a Fourier transform and a neural network to determine whether a known contaminant is present.

In accordance with another aspect of this invention, means are provided for transmitting light to all locations in the given panorama that is coded in accordance with information such as the identities of chemical contaminants detected and their location in the panorama. This is effected by transmitting laser light back along the axis through the aforesaid interferometer to the hyperbolic mirrors that direct it to all points in the panorama. One or more of the polarizers and PEM's of the interferometer are physically rotated about the said axis to different axial positions for each data to be transmitted. Thus, one combination of axial positions may correspond to one chemical, and a different combination to a different chemical or to the azimuth or elevation in the panorama. Each set of axial positions corresponds to a different Mueller matrix that is detected by a suitable receiver anywhere in the panorama and decoded to detect the information.

DETAILED DESCRIPTION OF THE INVENTION

Figure 1A:
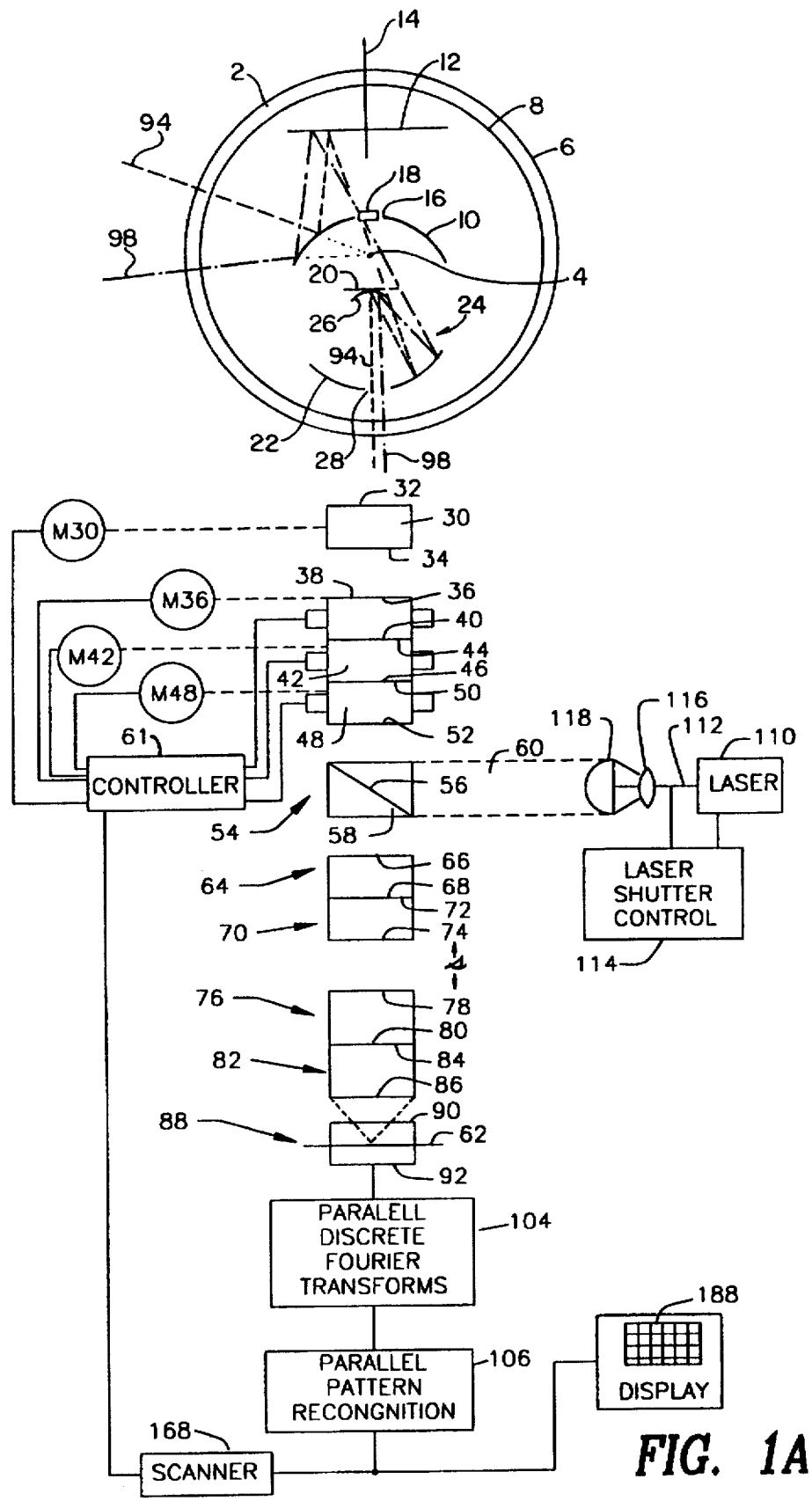
FIG. 1A is a schematic representation of apparatus incorporating both aspects of the invention.

In FIG. 1A a transparent spherical shell 2 having a center or pupil 4, an outer surface 6 and an inner surface 8 serves as mounting and protection means for an hyperboloid mirror 10 that reflects light passing radially through the shell 2 to another hyperboloid mirror 12 that in turn reflects light along a common axis 14 of the mirrors 10 and 12 and through an opening 16 in the mirror 10, and a system stop 18, which may be an iris. The light then passes to a first mirror 22 of a Schwarzchild collimator 24. Light reflected from the mirror 22 is in turn reflected by a second mirror 26 of the collimator 24 through a circular aperture 28 that may include a correction lens.

The collimated light emerging from the circular aperture, 28, proceeds parallel to the axis 14 to a series of optical elements comprised of a first linear polarizer 30 having successive surfaces 32 and 34 a first photo-elastic modulator, PEM 36, having successive surfaces 38 and 40, a second PEM 42 having successive surfaces 44, 46, a third PEM 48 having successive surfaces 50, 52, and a second linear polarizer 54 which could be the same as the linear polarizer 30 if the apparatus is not to be used for transmission, but is a cubic polarizer 54 having a first internal surface 56 and a second internal surface 58 that pass light coming along the axis 14 straight through and reflect light approaching along a perpendicular axis 60 along the axis 14 with linear polarization toward the collimator 24.

Figure 1B:
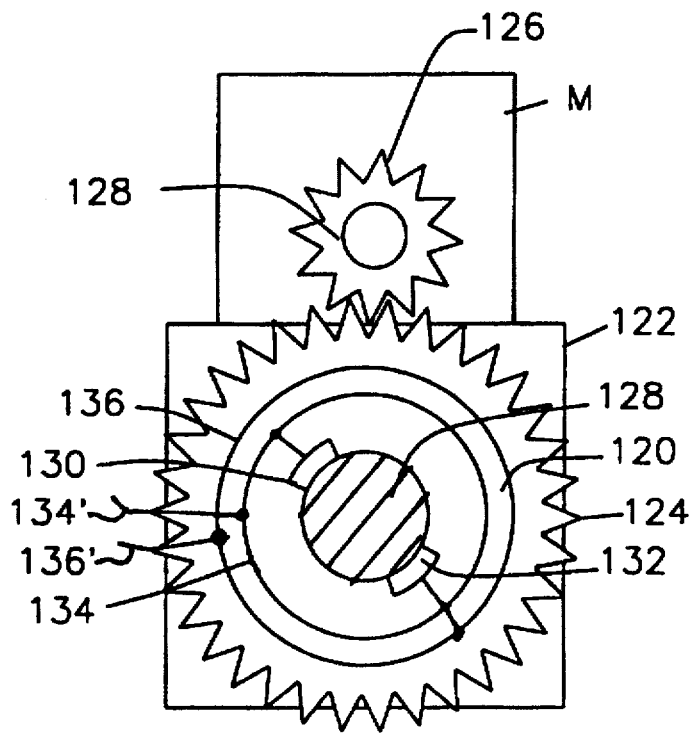
FIG. 1B shows the general structure of a PEM.

In order to translate the spectra received from a frequency domain to a time domain, the PEM's 36, 42, and 48 are respectively supplied with voltage waves of different frequencies that are preferably square waves and not harmonically related from a controller 61. These voltage waves vary the amount of light passing through a PEM on the extraordinary axis so as to effect a modulation that varies the frequency of light passing through it. The structure of the PEM's 36, 42, and 48 are shown in FIG. 1B, that will be described when the manner in which the apparatus of FIG. 1 operates as a transmitter of data is explained.

Light passing through the cubic polarizer 54 is focused onto a focal plane array 62 of photo detectors by a first lens 64 having successive surfaces 66, 68, a second lens 70 having successive surfaces 72, 74, a third lens 76 having successive surfaces, 78, 80, a fourth lens 82 having successive surfaces 84, 86 and a fifth lens 88 having successive surfaces 90, 92. Surface 92 is concave. The array, which has a smaller diameter than this lens, actually touches this surface.

Figure 1C:
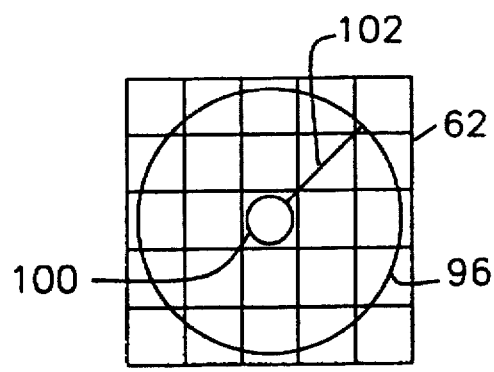
FIG. 1C illustrates an array of focal plane detectors.

FIG. 1C is a plan view of the focal plane array 62 showing n×n photo detectors, n being five in the illustration, but much greater e.g., in an actual embodiment of the invention. Light from 360° of the uppermost elevation of the panorama represented by a line 94 of dashes in FIG. 1A, will fall on the array 62 as indicated by a circle 96 and light from the lowest elevation of the panorama represented by a dash-dot line 98 in FIG. 1A will fall on the array 62 as indicated by a circle 100. Light from the same azimuth but different elevation will fall on a radial line such as 102. The azimuth angle goes around the annulus of FIG. 1C. The extreme ray elevations (i.e., the extreme field-of-view rays drawn as dashes) determine the inner and outer radii of this annulus.

The electrical signals produced by the $n^2$ detectors are processed in parallel discrete Fourier transforms indicated at 104, and each of the processed signals is respectively matched against spectra patterns for a number of chemical contaminants in a pattern recognition means 106.

Display of the positions of the panorama from which spectra for a contaminant is received can be made by an array 188, of light emitting diodes controlled by signals from the pattern recognition means 106 that are respectively derived from the photo detectors of the array 62 of FIG. 1C.

Information is optically transmitted to all points in the panorama that are within reasonable range in the following manner. A thin beam of light from a laser 110 passes to a shutter 112 that is placed in an open or a shut position by a shutter control 114. A diverging lens 116 increases the diameter of the beam to that of the optical path through the optical elements above the cube polarizer 54, and a lens 118 directs a collimated beam along the axis 60 to the cubic polarizer 54. The polarizer 54 linearly polarizes the collimated beam received along the axis 60 and directs it upward along the axis 14 to the PEM 48. As the collimated light successively passes through the PEM's 48, 42 and 36 and the polarizer 30, its intensity is changed, and because of the modulation by the voltage waves of different frequency supplied by the controller 61 to the PEM's 48, 42 and 36, the light contains components at these frequencies and harmonics thereof. The relative amplitudes of these components depends on the axial rotational positions of the cube polarizer 54, the PEM's 48, 42 and 36 and the polarizer 32. Changes in rotational position must be multiples of 45° with respect to x, y axes in an end view of the axis 14. The rotational positions for the polarizer 30, the PEM 36, PEM 42 and PEM 48 are set by the motors $M_{30}$, $M_{36}$, $M_{42}$ and $M_{48}$. No motor is required for the cubic polarizer 54 because the rotational positions of the PEM's 36, 42 and 48, and the polarizer 32 are rotated in reference to it.

Reference is now made to FIG. 1B for a description of an assembly for a PEM or for the polarizer 32. A disk 120 mounted for rotation in a housing 122 has a toothed periphery 124 engaging teeth 126 on a shaft 128 of a motor M that is mounted in the housing, 122. The motor M can be a stepping or a servo motor. If the assembly is for a polarizer, a disk of 128 of polarizing material is coaxially mounted within the disk 120 but if the assembly is for a PEM, the disk 128 is made of birefringent material. Electrodes 130 and 132 are mounted on the disk 120 at opposite sides thereof and in line with the extraordinary axis of the disk 128. The electrode 130 is connected to a conductive ring 134, and the electrode 132 is connected to a conductive ring 136. Brush contacts with the rings 134' and 136' are respectively mounted in the front surface, not shown, of the housing 122 at points 134' and 136' and respectively connected across a source of modulating voltage waves supplied by the controller 61. The voltage waves can be sinusoidal or in the form of pulses and have different frequencies depending on whether the apparatus is being used for identification of contaminants or for transmitting information.

Figure 2:
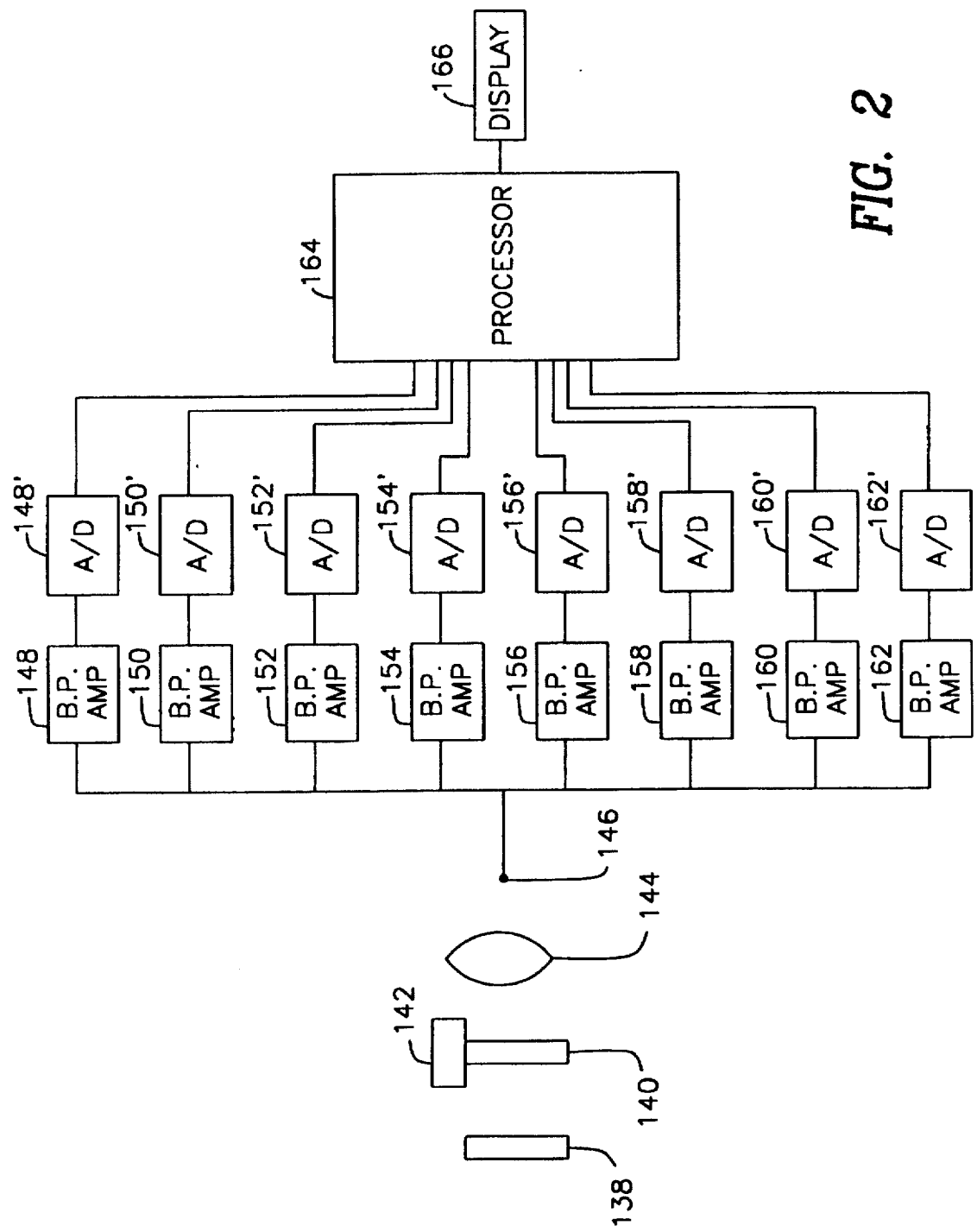
FIG. 2 is a block diagram of a receiver for decoding the coded transmission.

Laser light modulated in this way goes back through the collimator 24 and is directed by the hyperbolic mirrors 10 and 12 to all angular positions within the panorama, and the information carried thereby is recovered and displayed by a receiver such as shown by FIG. 2. The receiver of FIG. 2 is comprised of an optical filter 138 passing infrared, a linear polarizer 140 that can be rotated to any rotational position by a control 142 and a lens 144 for focusing light passing through the polarizer 140 onto a photo-electric detector 146. The detector 146 is coupled to a number of band pass amplifiers 148–162 that respectively respond to the different modulation frequencies of the laser lights that are produced by the PEM's 48, 42 and 36.

The outputs of each of the amplifiers, 148–162, are respectively coupled to A/D converters 148'–162'. A processor 164 examines the outputs of the A/D converters to determine what the information is in accordance with a code, and the information is displayed in any suitable manner by a display means, 166.

Optical parameters of the optical surfaces of the system of FIG. 1A that are an example of what may be used are presented in the following table. The surfaces are listed in the order in which light from the panorama passes through them, and where an element has two surfaces, they are also indicated as 1st and 2nd in the order that the light passes through them.

| Surface | Type | Radius (mm) | Thickness (mm) | Glass | Diameter (mm) | Conic Constant |
|---|---|---|---|---|---|---|
| OBJECT | standard | infinity | infinity | | infinity | 0 |
| 4 | entrance pupil | infinity | −181.4137 | | 1.013368 | 0 |
| 6 | shell 1st | 181.4137 | 9.525 | Ge | 357.3457 | 0 |
| 8 | shell 2nd | 171.8887 | 141.983 | | 338.5839 | 0 |
| 10 | hyperbol 1 | 65.31383 | −132.696 | mirror | 106.9004 | — |
| 12 | hyperbol 2 | 658.49 | 132.696 | mirror | 63.99708 | 1.40184 |
| 16 | standard | Infinity | 1.2 | | 4.921312 | 1 |
| 18 | system stop | Infinity | 100 | | 4.93158 | — |
| 20 | circular obscuration | Infinity | 96 | | 49.02397 | 15.70058 |
| 22 | Schwarz 1 | −150.6474 | −93.10521 | mirror | 91.7503 | 0 |
| 26 | Schwarz 2 | −57.54218 | 92.26642 | mirror | 21.8845 | 0 |

-continued

| Surface | Type | Radius (mm) | Thickness (mm) | Glass | Diameter (mm) | Conic Constant |
|---|---|---|---|---|---|---|
| 28 | circular aperture | Infinity | 0 | | 23.41338 | 0 |
| 32 | polarizer 1st | Infinity | 12.25 | Ge | 32 | 0 |
| | | | | | | 0 |
| 34 | polarizer 1 2nd | Infinity | 3 | | 32 | 0 |
| | | | | | | 0 |
| 38 | PEM 1 1st | Infinity | 12.25 | ZnSe | 32 | 0 |
| 40 | PEM 1 2nd | Infinity | 3.00 | | 32 | 0 |
| 44 | PEM 2 1st | Infinity | 12.25 | ZnSe | 32 | 0 |
| 46 | PEM 2 2nd | Infinity | 3.00 | | 32 | 0 |
| 50 | PEM 3 1st | Infinity | 12.25 | ZnSe | 32 | 0 |
| 52 | PEM 3 2nd | Infinity | 1 | | 32 | 0 |
| 56 | polarizer 2 1st | Infinity | 12.25 | Ge | 32 | 0 |
| | | | | | | 0 |
| 58 | polarizer 2 2nd | Infinity | 1 | | 32 | 0 |
| | | | | | | 0 |
| 66 | lens 1 1 | 371.5075 | 10 | ZnSe | 25.78086 | 0 |
| 68 | lens 1 2 | −371.5075 | 0 | | 25.78086 | 0 |
| 72 | lens 2 1 | 236.9778 | 25.4 | ZnSe | 25.2852 | 0 |
| 74 | lens 2 2 | 426.1437 | 159.295 | | 25.2852 | 0 |
| 78 | lens 3 1 | 81.5522 | 25.4 | ZnSe | 22.30916 | 0 |
| 80 | lens 3 2 | 332.6622 | 0 | | 22.30916 | 0 |
| 84 | lens 4 1 | 110.7427 | 25.4 | ZnSe | 21.07948 | 0 |
| 86 | lens 4 2 | 37.46332 | 0 | | 21.07948 | 0 |
| 90 | lens 5 1 | 11.5571 | 14.7678 | ZnSe | 19.66834 | 0 |
| 92 | lens 5 2 | 7.00817 | 0.33248 | | 19.66834 | 0 |
| IMAGE | focal plane array | Infinity | 0 | HgCdTe | 6.34204 | |

In order to simplify the explanation of the manner in which data is transmitted, a special case is analyzed in which both polarizers 54 and 30 are vertically polarized, the extraordinary axis of the PEM 48 is at +45°; the extraordinary axis of the PEM 36 is −45°, and the PEM, 42, is not modulated but can be at any angle represented by $\Psi 42$. With these restrictions the Stokes vector for the initial light $I_o$ in the path 60 of FIG. 1A and the Light $I_f$ leaving the polarizer 30 may be respectively expressed by equations (1) and (2).

$$S^i = I_o \begin{pmatrix} 1 \\ -1 \\ 0 \\ 0 \end{pmatrix} \quad (1)$$

$$S^f = I_f \begin{pmatrix} 1 \\ -1 \\ 0 \\ 0 \end{pmatrix} \quad (2)$$

The transformation of the Stokes vectors defines the Mueller matrix $\Omega$ as shown in equation (3).

$$S^f = \Omega S^i \quad (3)$$

The Mueller matrix $\Omega$ is obtained by successively multiplying the Mueller matrices starting with the one in the far right of equation (4) below.

$$\Omega = \Omega_{30} \, \Omega_{36} \, \Omega_{42} \, \Omega_{48} \, \Omega_{54} \quad (4)$$

The Mueller matrices are substituted in equations (3) and (4) to yield the following expression after left multiplication by $s^{iY}$ where Y is the transposition operator. Because the PEM, 42, is not modulated, the elements $\Psi_{11}$ etc of the Mueller matrix are constants, but if it were modulated, it would contain elements like those for the PEM's 36 and 48, involving its modulating frequency $\omega_2$. The Mueller matrices for the different optical elements are indicated by their numbers primed.

$$I_f = \frac{I_o}{8} (1 - 100) \underbrace{\begin{pmatrix} 1 & -1 & 0 & 0 \\ -1 & 1 & 0 & 0 \\ 0 & 0 & 0 & 0 \\ 0 & 0 & 0 & 0 \end{pmatrix}}_{30'} \underbrace{\begin{pmatrix} 1 & 0 & 0 & 0 \\ 0 & \cos(\delta_0\cos\omega_3 t) & 0 & +\sin(\delta_0\cos\omega_3 t) \\ 0 & 0 & 1 & 0 \\ 0 & -\sin(\delta_0\cos\omega_3 t) & 0 & \cos(\delta_0\cos\omega_3 t) \end{pmatrix}}_{36'} \underbrace{\begin{pmatrix} \Psi_{11} & \Psi_{12} & \Psi_{13} & \Psi_{14} \\ \Psi_{21} & \Psi_{22} & \Psi_{23} & \Psi_{24} \\ \Psi_{31} & \Psi_{32} & \Psi_{33} & \Psi_{34} \\ \Psi_{41} & \Psi_{42} & \Psi_{43} & \Psi_{44} \end{pmatrix}}_{42'} \underbrace{\begin{pmatrix} 1 & 0 & 0 & 0 \\ 0 & \cos(\delta_0\cos\omega_1 t) & 0 & -\sin(\delta_0\cos\omega_1 t) \\ 0 & 0 & 1 & 0 \\ 0 & +\sin(\delta_0\cos\omega_1 t) & 0 & \cos(\delta_0\cos\omega_1 t) \end{pmatrix}}_{48'} \underbrace{\begin{pmatrix} 1 & -1 & 0 & 0 \\ -1 & 1 & 0 & 0 \\ 0 & 0 & 0 & 0 \\ 0 & 0 & 0 & 0 \end{pmatrix}}_{54'} \underbrace{\begin{pmatrix} 1 \\ -1 \\ 0 \\ 0 \end{pmatrix}}_{60'} \quad (5)$$

The intensity waveform of equation (1) contains sine and cosine functionals that can be separated by use of the Bessel function of equation (2).

$$e^{i\delta_0 \cos(\omega t)} = J_0(\delta_0) + 2 \sum_{k=1}^{\infty} i^k J_k(\delta_0)\cos(k\omega t) \quad (6)$$

In this equation $J_k$ is a Bessel function of order K and i is the imaginary number $\sqrt{-1}$. The maximum retardation of the PEM's is preset $\delta_o = 2.404$ radians. This nulls the zero order Bessel function $J_o(2.404)=0$, thus simplifying the intensity waveform expansion. Both real and imaginary parts of equation (5) can be expanded by the following infinite series.

$$\frac{\cos(\delta_0 \cos\omega t)}{2} = -J_2(\delta_0)\cos 2\omega t + J_4(\delta_0)\cos 4\omega t - J_6(\delta_0)\cos 6\omega t + \ldots \quad (7)$$

$$\frac{\sin(\delta_0 \cos\omega t)}{2} = J_1(\delta_0)\cos\omega t - J_3(\delta_0)\cos 3\omega t + J_5(\delta_0)\cos 5\omega t - \ldots \quad (8)$$

A normalized beam intensity exiting the polarizer 30 can be derived by substituting equations (7) and (8) in equation (5), applying the cosine law and then performing matrix multiplication and factoring to derive the following equation showing the ratio $I_f/I_o$.

$$\frac{I_f}{I_o} = \ldots + 0.270\psi_{44}(\omega_2 t, \theta_2)\cos(\omega_3 \pm \omega_1)t - \quad (9)$$
$$0.224\psi_{42}(\psi_2 t, \theta_2)\cos(\omega_3 \pm 2\omega_1)t -$$
$$0.520\psi_{41}(\omega_2 t, \theta_2)\cos(\omega_3 t) - 0.224\psi_{24}(\omega_2 t, \theta_2)\cos(2\psi_3 \pm \omega_1)t +$$
$$0.186\psi_{22}(\omega_2 t, \theta_2)\cos(2\omega_3 \pm 2\omega_1)t + 0.431\psi_{21}(\omega_2 t, \theta_2)\cos(2\omega_3 t) +$$
$$0.431\psi_{12}(\omega_2 t, \theta_2)\cos(2\omega_1 t) - 0.520\psi_{14}(\omega_2 t, \theta_2)\cos(\omega_1 t) + \psi_{11}(\omega_2 t)$$

The expansion by equation (9) shows that the Bessel terms of the second order or less dominate the beam intensity; $J_1(\delta_o)=0.520$ and $J_2(\delta_o)=0.431$.

Equation (9) shows that the beam intensity $I_f$ is represented by an infinite series of discrete frequency terms, i.e. the sum and differences of all integral multiples of two of the three modulation frequencies $\omega_1$ and $\omega_3$ for the PEM's 36 and 48 respectively and their second harmonics. The amplitude of each frequency component is given by the product of one or more Bessel functions of integer order which approach zero rapidly as the order increases and a D.C. component that is always 1 whether the PEM 42 is modulated or not.

Equation 9 is an expression for the light emanating from the polarizers 32 for a special case where the axial rotation of the optical elements is as shown below.

| +45° | 0° | 0° | −45° |
|---|---|---|---|
| 54 | 48 | 36 | 32 |

In this case, hereinafter referred to as case A, the Mueller matrix elements as shown for the unmodulated PEM 42 in equation (5) are assigned to frequencies as follows.

Case A $\Psi 44-(\omega_3+\omega_1)$ or $(\omega_3-\omega_1)$
$\Psi 42-(\omega_3+2\omega_1)$ or $(\omega_3-2\omega_1)$
$\Psi 41-\omega_3$
$\Psi 24-(2\omega_3+\omega_1)$ or $(2\omega_3-\omega_1)$
$\Psi 22-(2\omega_3+2\omega_1)$ or $(2\omega_3-2\omega_1)$
$\Psi 21-2\omega_3$
$\Psi 12-2\omega_1$
$\Psi 14-\omega_1$ In case B, the optical elements are positioned as indicated below.

| 0° | −45° | 0° | −45° |
|---|---|---|---|
| 54 | 48 | 36 | 32 |

This assigns the frequencies for given Mueller matrix elements as follows.

$\Psi 44-(\omega_3+\omega_1)$ or $(\omega_3-\omega_1)$
$\Psi 42-(\omega_3+2\omega_1)$ or $(\omega_3-2\omega_1)$
$\Psi 41-\omega_3$
$\Psi 34-(2\omega_3+\omega_1)$ or $(2\omega_3-\omega_1)$
$\Psi 32-(2\omega_3+2\omega_1)$ or $(2\omega_3-2\omega_1)$
$\Psi 31-2\omega_3$
$\Psi 12-2\omega_1$
$\Psi 14-\omega_1$ In Case C, the optical elements are positioned as indicated below.

| +45° | 0° | 0° | −45° |
|---|---|---|---|
| 54 | 48 | 36 | 32 |

This assigns the frequencies for given Mueller matrix elements of the middle PEM 42 as follows.

$\Psi 44-(\omega_3+\omega_1)$ or $(\omega_3-\omega_1)$
$\Psi 43-(\omega_3+2\omega_1)$ or $(\omega_3-2\omega_1)$
$\Psi 41-\omega_3$
$\Psi 34-(2\omega_3+\omega_1)$ or $(2\omega_3-\omega_1)$
$\Psi 33-(2\omega_3+2\omega_1)$ or $(2\omega_3-2\omega_1)$
$\Psi 31-2\omega_3$
$\Psi 13-2\omega_1$
$\Psi 14-\omega_1$ In case D, the optical elements are positioned as indicated below.

| +45° | 0° | +45° | 0° |
|---|---|---|---|
| 54 | 48 | 36 | 32 |

This assigns the frequencies for the given Muller matrix components as indicated below.

$\Psi 44-(\omega_3+\omega_1)$ or $(\omega_3-\omega_1)$
$\Psi 43-(\omega_3+2\omega_1)$ or $(\omega_3-2\omega_1)$
$\Psi 41-\omega_3$
$\Psi 24-(2\omega_3+\omega_1)$ or $(2\omega_3-\omega_1)$
$\Psi 23-(2\omega_3+2\omega_1)$ or $(2\omega_3-2\omega_1)$
$\Psi 21-2\omega_3$
$\Psi 13-2\omega_1$
$\Psi 14-\omega_1$ At the receiver shown in FIG. 2, the position of the light from the polarizer 30 that is passed via the hyperbolic mirrors 10 and 12 to the panorama and which fails on the filter 138 passes to the polarizer 140, and the control 142 is adjusted to pass the maximum intensity of light for rotating its plane of polarization. The lens 144 focuses the light onto a single detector 146, and its output is applied to band pass amplifiers 148, 150, 152, 154, 156, 158, 160 and 162 that are respectively tuned to pass one of the frequencies of equation (9) such as those shown in Case A infra. Furthermore, the gains of the amplifiers 148–162 are adjusted so that all the Mueller matrix elements are normalized and bound between +1 and −1. The amplifiers 148–162 are respectively coupled via AD's 148'–162' to a processor 164.

For each of the cases A, B, C and D the eight frequencies are assigned to different Mueller coefficients $\Psi 44$, $\Psi 43$, Ψ42, Ψ41, Ψ44, Ψ34, Ψ33, Ψ32, Ψ31, Ψ24, Ψ23, Ψ22, Ψ21, Ψ14, Ψ13 and Ψ12, which respectively can have values of +1, −1 or 0. By setting up the axial rotation of the polarizers 54 and 30 and the PEM's 48 and 36 as required by each of the cases A, B, C and D, the outputs of the A/D's 148'–162' for each case can be determined, i.e., each of the cases have a known pattern of +1's, −1's and 0's. A processor 164 recognizes these patterns and outputs a different signal for each that can be displayed on a display 166.

Thus, in order to send a message, the controller 61 of FIG. 1A is programmed to control the motors M48, M36 and M30 so as to rotate the PEM 48, PEM 36 and the polarizer 30 to successive positions for a series of the cases A, B, C and D as required by a predetermined code to represent the chemical contaminants detected by each of the parallel pattern recognition circuits of the pattern recognition means 106 as well as the positions of the detectors of the array 62 supplying them with signals. This requires a scanner 168 that supplies signals from the parallel pattern recognition means 106 along a known path. Thus, for example, the scanner 168 might scan signals produced by the pattern recognition means 106 from signals produced along successive rows of detection in the array 62. The start of a scan could be indicated by a series of a given number of case A's that exceed any series of case A's in the codes for identifying chemical contaminants. The processor 164 at the receiver would recognize this signal and synchronize the scanning of the display 166 with it. A counter, not shown, in the display 166 moves from position to position at uniformly spaced counts. A similar counter, not shown, in the scanner 168 operates in the same way. At each position in the scan, the controller 61 creates a code of cases A, B, C and D corresponding to the chemical contaminant identified by the parallel recognition means 106. Thus, if, for example, different chemicals are respectively represented by AA, BB, CC and DD. A signal might consist of successive transmissions of the cases such as AAAA for the start of scan followed by the transmission of a series of A's—if no chemical contaminant is detected followed by one of A,A; B,B; C,C or DD depending on the chemical contaminant detected at each of the detectors of the array 62. It is thought that those skilled in the art could provide other ways of transmitting and reproducing coded information. The invention lies in the combination of means for generating and transmitting code letters to all parts of the panorama at the same time.

In this example of the invention, the fixed Mueller matrix elements of the unmodulated center PEM 42 control the amplitudes of different combinations of the modulation frequencies of the outer PEM's 48 and 36, but the center PEM 42 could also be modulated. This however would require a complicated expansion of equation 8 and involve combinations of the modulating frequencies of all three PEM's.

I claim:
1. A panoramic spectroradiometer, comprising:
   (a) means for directing light approaching said spectroradiometer from a panorama along an axis;
   (b) means for collimating light passing along said axis, wherein said means for collimating is comprised of Schwarzchild optics;
   (c) an interferometer located so as to receive light from said light collimating means;
   (d) means for optically imaging said light passing through said interferometer;
   (e) a planar array of detectors located so as to receive light that has passed through said optical imaging means; and
   (f) means for displaying the intensities of light detected by said array of detectors.

2. A panoramic spectroradiometer as set forth in claim 1, wherein said means for directing light along an axis is comprised of:
   (a) a first hyperboloid mirror centered on said axis so as to reflect light in one direction along it, said first hyperboloid mirror having means defining an axial opening; and
   (b) a second hyperboloid mirror centered on said axis and located so as to reflect light reflected by said first hyperboloid mirror through said axial opening.

3. A panoramic spectroradiometer as set forth in claim 1, wherein said optical imaging means comprises a plurality of lenses.

4. A panoramic spectroradiometer as set forth in claim 1, wherein said interferometer is comprised of:
   (a) a first linear polarizer mounted on said axis so as to receive light from said means for collimating;
   (b) a second polarizer mounted on said axis and spaced from said first polarizer;
   (c) a plurality of photoelastic modulators mounted on said axis between said first and second polarizers; and
   (d) means for modulating said plurality of photoelastic modulators with voltage waves of different frequencies.

5. A panoramic spectroradiometer as set forth in claim 4, further comprising:
   (a) a source of laser light;
   (b) means for collimating light from said source and directing said collimated light to said second polarizer so that it is linearly polarized and directed upward to said photoelastic modulators; and
   (c) means for adjusting the rotational positions of at least one of said first and second polarizers and said plurality of photoelastic modulators so that the Mueller matrix of laser light is changed and said light is transmitted out to angular positions within the panorama.

6. A panoramic spectroradiometer as set forth in claim 5, wherein said adjusting means comprises a plurality of motors.

7. A panoramic spectroradiometer as set forth in claim 5, further comprising:
   (a) a receiver, said receiver having an adjustable linear polarizer and receiving said laser light transmitted to positions within the panorama;
   (b) a photo detector;
   (c) means for focussing light passing through said linear polarizer onto said detector;
   (d) a plurality of band pass amplifiers coupled to said detector;
   (e) a processor;
   (f) means for coupling said processor to said amplifiers; said processor being adapted to recognize different patterns of outputs of said amplifiers and to provide a different signal for each pattern; and
   (g) means for displaying said signals.

8. A panoramic spectroradiometer, comprising:
   (a) a first hyperboloid minor having a first central opening;
   (b) a second hyperboloid mirror mounted so as to reflect light reflected by said first hyperboloid mirror through said first central opening;
   (c) a primary mirror of a Schwarzchild collimator mounted so as to receive and reflect light passing through said first central opening, said primary mirror having a second central opening;

(d) a secondary mirror of said collimator for reflecting light received from said primary mirror through said second central opening;

(e) a first polarizer mounted so as to receive light passing through said second central opening;

(f) a plurality of photo elastic modulators mounted in the path of light passing through said first polarizer;

(g) a second polarizer;

(h) an array of photoelectric detectors;

(i) means for focussing light emerging from said second polarizer onto said array of photoelectric detectors; and (j) means for matching the spectral components of the signals from each detector with the spectral response of a known chemical contaminant.

9. The panoramic spectroradiometer of claim 8, further comprising means for modulating said plurality of photoelastic modulators with voltage waves of different frequencies.

10. The panoramic spectroradiometer of claim 9, further comprising means for transmitting information to points within the panorama.

11. The panoramic spectroradiometer of claim 10, wherein said transmitting means comprises:

(a) a source of laser light;

(b) means for collimating and directing said laser light to said second polarizer so that it is directed to said plurality of photoelastic modulators;

(c) means for adjusting the rotational positions of at least one of said first and second polarizers and said plurality of photoelastic modulators so that the Mueller matrix of laser light is changed and said light is transmitted out to angular positions within the panorama.

12. The panoramic spectroradiometer of claim 11, wherein said adjusting means comprises a plurality of motors.

13. The panoramic spectroradiometer of claim 11, further comprising:

(a) a receiver, said receiver having an adjustable linear polarizer and receiving said laser light transmitted to positions within the panorama;

(b) a photodetector;

(c) means for focussing light passing through said linear polarizer onto said detector;

(d) a plurality of band pass amplifiers coupled to said detector;

(e) a processor;

(f) means for coupling said processor to said amplifiers, said processor being adapted to recognize different patterns of output of said amplifiers and to provide a different signal for each pattern; and (g) means for displaying said signals.

\* \* \* \* \*